E. M. TORMIN.
APPARATUS FOR INDICATING THE CONDITION OF STORAGE BATTERIES.
APPLICATION FILED FEB. 25, 1910.

1,012,298.

Patented Dec. 19, 1911.

UNITED STATES PATENT OFFICE.

EGMONT MAX TORMIN, OF NEWTON CENTER, MASSACHUSETTS, ASSIGNOR TO HOLTZER-CABOT ELECTRIC COMPANY, OF BROOKLINE, MASSACHUSETTS, A CORPORATION OF MASSACHUSETTS.

APPARATUS FOR INDICATING THE CONDITION OF STORAGE BATTERIES.

1,012,298.     Specification of Letters Patent.     Patented Dec. 19, 1911.

Application filed February 25, 1910. Serial No. 545,816.

*To all whom it may concern:*

Be it known that I, EGMONT M. TORMIN, a subject of the Emperor of Germany, and a resident of Newton Center, in the county of Middlesex and State of Massachusetts, have invented a new and useful Improvement in Apparatus for Indicating the Condition of Storage Batteries, of which the following is a specification.

It is well known that the condition of a storage battery as regards its charge may be more readily determined by the specific gravity of its electrolyte than by the readings of a volt-meter or ammeter associated with its circuit. I have invented a system especially adapted for use on motor-vehicles and motor-boats whereby the storage-battery connected in the engine sparking circuit and in the lighting circuit may be charged by a generator driven by the engine of such vehicle or boat. In this system it is necessary that the operator be able to readily ascertain the condition of the battery.

It is therefore the object of the present invention to provide an apparatus whereby the condition of a storage battery may be conveniently determined from the specific gravity of its electrolyte.

The drawings which accompany and form part of this specification illustrate the principle of my invention.

Figure 1:
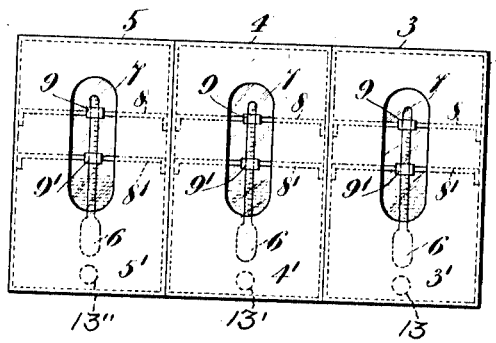
Figure 2:
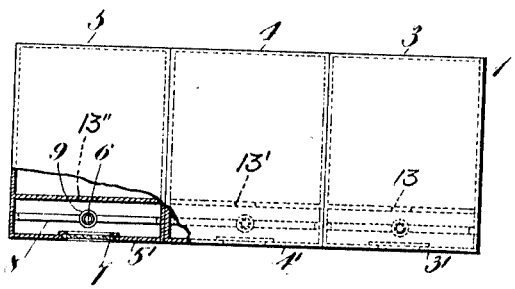

In the drawings Figure 1 is a side view of a storage battery embodying my improvement and Fig. 2 is a plan view thereof.

In the particular embodiments of my invention selected for illustration, 1 represents a storage battery shown in the present instance as consisting of three cells, 3, 4 and 5, each of which is provided with a chamber or receptacle 3', 4', 5'¹ respectively, formed by a partition extending across each cell and communicating with the same by the passageways 13, 13', 13'', each chamber being adapted to contain a portion of the electrolyte of said battery. A device whereby the specific gravity of the electrolyte may be determined or indicated, such as the hydrometer 6, is placed in the electrolyte in each of said receptacles and suitable means preferably are employed for maintaining said hydrometer in a substantially vertical position. In the present instance such means are shown as the arms 8 8' which are secured to the sides of each receptacle and which support the rings 9 9' through which the stem of the hydrometer passes. Each receptacle is provided with means such as the window 7 of glass or other suitable transparent material whereby the hydrometer may be viewed from the exterior of the cell.

As the storage battery discharges, the specific gravity of the electrolyte is lowered so that when the hydrometer indicates that the specific gravity has fallen to a certain value, the operator can set in motion the mechanism whereby the battery may be re-charged. When the hydrometer indicates that the specific gravity has risen to a certain value, the operator may stop the charging operation. It will be understood, however, that it is not necessary that the hydrometer be graduated in absolute values and that it may be provided with arbitrary graduations indicating respectively when the charging operation should begin and when it should be discontinued.

While the arrangement shown in Figs. 1 and 2 is a simple and convenient means for enabling the operator to readily determine the condition of his battery, it will be readily apparent that various other arrangements for accomplishing this result may be devised without departing from the principle of my invention.

I claim:

1. In an apparatus for indicating the condition of a storage battery, a receptacle communicating with the storage battery cell and formed in part by the walls thereof, said receptacle being adapted to contain a portion of the electrolyte of said battery, a hydrometer in said receptacle, means for maintaining said hydrometer in a substantially vertical position, and a window of transparent material secured to said receptacle.

2. In an apparatus for indicating the condition of a storage battery, a storage battery cell, a partition extending across the same and forming a chamber, said chamber communicating with said cell and adapted to contain a portion of the electrolyte thereof, a hydrometer in said chamber, and a window of transparent material secured to the front wall of said chamber.

3. In an apparatus for indicating the condition of a storage battery, a storage battery cell, a partition extending across the same and forming a chamber, said chamber communicating with said cell and adapted to contain a portion of the electrolyte thereof, a hydrometer in said chamber, means for maintaining said hydrometer in a substantially vertical position, and a window of transparent material secured to the front wall of said chamber.

In testimony whereof, I have hereunto subscribed my name this 23rd day of Feb. 1910.

EGMONT MAX TORMIN.

Witnesses:
 E. B. TOMLINSON,
 GEO. K. WOODWORTH.